UNITED STATES PATENT OFFICE.

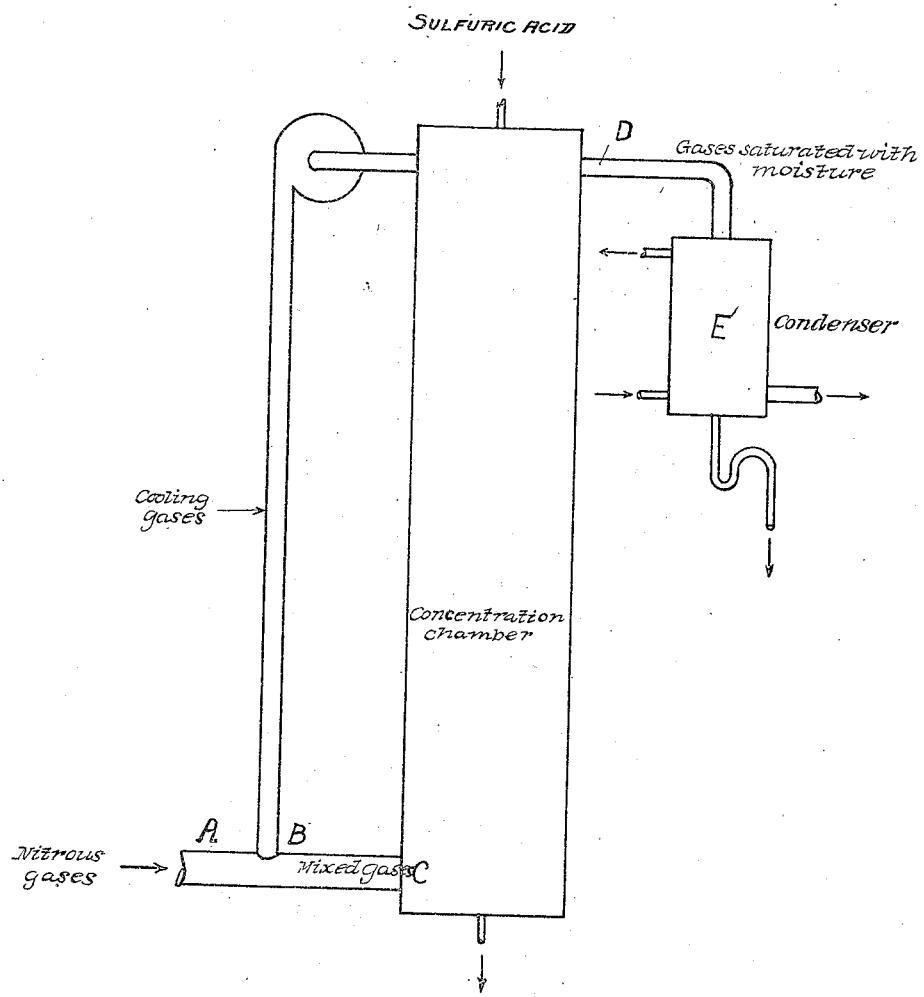

ANTON CHRISTIAN BOHRE, DECEASED, BY KATHARINA CHARLOTTE BOHRE, EXECUTRIX, OF BERGEN, NORWAY, ASSIGNOR TO NORSK HYDRO-ELEKTRISK KVAELSTOFAKTIESELSKAB, OF CHRISTIANIA, NORWAY.

CONCENTRATION OF SULFURIC ACID.

1,353,448.     Specification of Letters Patent.     Patented Sept. 21, 1920.

Application filed March 27, 1919. Serial No. 285,674.

*To all whom it may concern:*

Be it known that ANTON CHRISTIAN BOHRE, deceased, did invent certain new and useful Improvements in the Concentration of Sulfuric Acid, and that I, KATHARINA CHARLOTTE BOHRE, of Bergen, Norway, his widow and executor, do hereby declare the following to be a full, clear, and exact description of the invention, such as will enable others skilled in the art to which it appertains to make and use the same, reference being had to the accompanying drawings, and to letters or figures of reference thereon, which form a part of this specification.

This invention relates to the concentration of sulfuric acid by means of heated gases and has for its object a process as well as an apparatus which allows of carrying such concentration into effect by simple means and in an efficient manner.

It has already been suggested to concentrate sulfuric acid directly by means of hot nitrous gases by passing the gases through an acid-proof tower charged with dilute sulfuric acid. As known this method, however, has not met with success and it has not been possible to make this concentration method practically useful. This is due among other reasons to the fact that the subsequent absorption of the nitrous gases is rendered difficult by the moisture taken up in the gases, said moisture being condensed in the subsequent absorption system, whereby the temperature in this latter is considerably raised and a very inefficient absorption results.

The degree of saturation of the gases as regards the moisture being comparatively low it is difficult to bring about the condensation of moisture by means of cooling. Moreover it is not possible to employ the hot gases directly with the high temperature prevailing in the same on their leaving the electrical furnaces viz. about 1000–1200° C. because the sulfuric acid in contact with the gases of such high temperatures is liable to be decomposed producing fumes which it is very difficult to absorb. It has therefore been necessary either to dilute the gases with air or to bring the temperature down by other cooling means.

The present invention now has for its object a process, allowing of directly using high temperature nitrous gases for the concentration of dilute sulfuric acid and at the same time the gas leaving the system is practically saturated with moisture which can thereupon be removed to the greater part in comparatively small condensation apparatuses before the gases are introduced into the absorption system.

A preferred method of carrying the invention into effect is described in the following by way of example:

A portion of the gases saturated with moisture, which leaves the concentration apparatus is returned and utilized to cool the hot nitrous gases from the electrical furnaces. The quantities are so proportioned, that the quantity of circulating gases is sufficient to lower the temperature to 500–600° C. A quantity of escape gases which correspond to the supply of hot gases and which are saturated with moisture is at the same time withdrawn from the system. When the substantial quantity of vapor contained in these gases has been condensed the gases can safely be introduced into the absorption system for the nitrous gases.

A plant for use in carrying this process into effect is diagrammatically illustrated in the accompanying drawing by way of example:

Hot nitrous gases with a temperature of about 1000° C. are introduced at A. These gases are at B mixed with gases from the upper part of the apparatus in such proportion that the gases when entering the tower at C have a temperature of 500° C.

The gases saturated with moisture leave the apparatus at D with a temperature of about 90° C. and are introduced into a condenser E. where the greater part of the moisture is separated out. The condensation product consists of a very dilute nitric acid, which is suitably utilized in the absorption system to which it is supplied instead of water.

By maintaining a circulation of the moist gases from the concentration plant it is made possible to lower the temperature of the nitrous gases sufficiently to avoid decomposition of the sulfuric acid and the resulting production of fumes. This is attained without diluting the nitrous gases, which would have been the result if air had been added. Nor is it necessary to remove any of the heat contained in the gases by means of cooling which would have resulted in an increased consumption of gases as well as the drawbacks connected herewith. The result is also attained that the escaping gases are practically completely saturated with moisture, so that the condensation of moisture may take place in an apparatus of a comparatively small size.

Claim:

The process for the concentration of sulfuric acid which consists in passing a current of hot nitrous gases having a temperature of above 600° C. in contact with the acid to be concentrated, and mixing a portion of the resulting moist gas with the current of hot nitrous gases.

KATHARINA CHARLOTTE BOHRE,
*Executrix of Anton Christian Bohre, deceased.*